(12) United States Patent
Yang et al.

(10) Patent No.: US 12,360,386 B2
(45) Date of Patent: Jul. 15, 2025

(54) CAMERA WITH TILT COMPENSATION

(71) Applicant: Apple Inc., Cupertino, CA (US)

(72) Inventors: Qiang Yang, Fremont, CA (US);
Aurelien R Hubert, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 538 days.

(21) Appl. No.: 17/664,351

(22) Filed: May 20, 2022

(65) Prior Publication Data

US 2023/0004017 A1    Jan. 5, 2023

Related U.S. Application Data

(60) Provisional application No. 63/217,256, filed on Jun. 30, 2021.

(51) Int. Cl.
| | | |
|---|---|---|
| *G02B 27/64* | (2006.01) | |
| *G02B 7/09* | (2021.01) | |
| *G03B 5/00* | (2021.01) | |
| *H04N 23/54* | (2023.01) | |
| *H04N 23/68* | (2023.01) | |

(52) U.S. Cl.
CPC ............. *G02B 27/646* (2013.01); *G02B 7/09* (2013.01); *G03B 5/00* (2013.01); *H04N 23/54* (2023.01); *H04N 23/687* (2023.01); *G03B 2205/0007* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

| | | |
|---|---|---|
| 9,360,735 B2 | 6/2016 | Lim et al. |
| 9,720,251 B2 | 8/2017 | Han et al. |
| 10,382,698 B2 | 8/2019 | Sharma et al. |
| 2013/0119785 A1 | 5/2013 | Han |
| 2015/0319345 A1 | 11/2015 | Park |

(Continued)

FOREIGN PATENT DOCUMENTS

| | | |
|---|---|---|
| CN | 210142249 | 3/2020 |
| CN | 213581542 | 6/2021 |

(Continued)

OTHER PUBLICATIONS

Notice of Allowance from Korean Patent Application No. 10-2022-0065824, dated Sep. 25, 2024, pp. 1-5.

(Continued)

*Primary Examiner* — Derek S. Chapel
(74) *Attorney, Agent, or Firm* — Robert C. Kowert; Kowert, Hood, Munyon, Rankin & Goetzel, P.C.

(57) ABSTRACT

A camera may include a tilt actuator having one or more tilt magnets and one or more tilt coils. The tilt actuator may detect unexpected tilt between one or more lenses and an image sensor of the camera. The tilt actuator may control current of the tilt coils to interact with magnetic fields of the tilt magnets to generate motive force to rotate the lenses relative to the image sensor around one or more axes to compensate for the detected tilt. In addition, the tilt coils and tilt magnets may interact to move the lenses relative to the image sensor along an optical axis of the lenses to adjust a focus of the camera.

18 Claims, 16 Drawing Sheets

(56) References Cited

U.S. PATENT DOCUMENTS

| | | |
|---|---|---|
| 2017/0075129 A1 | 3/2017 | Hsu et al. |
| 2017/0094187 A1 | 3/2017 | Sharma et al. |
| 2017/0199392 A1 | 7/2017 | Zhou |
| 2018/0356646 A1 | 12/2018 | Hu et al. |
| 2019/0104239 A1 | 4/2019 | Aschwanden et al. |
| 2020/0012068 A1 | 1/2020 | Lim et al. |
| 2021/0409600 A1* | 12/2021 | Le ............................ G02B 7/08 |

FOREIGN PATENT DOCUMENTS

| | | |
|---|---|---|
| KR | 10-20100104384 A | 9/2010 |
| KR | 20140003022 | 1/2014 |
| KR | 10-1470470 B1 | 12/2014 |
| KR | 10-20170018136 A | 2/2017 |
| KR | 10-20180116486 A | 10/2018 |
| KR | 10-2019-0133796 | 12/2019 |
| KR | 10-20200020754 A | 2/2020 |
| KR | 10-2020-0128174 | 11/2020 |
| WO | 2014100516 | 6/2014 |
| WO | 2018082061 | 5/2018 |

OTHER PUBLICATIONS

Extended Eurpean Search Report from Application No. 22176083. 8-1020, pp. 1-12, dated Nov. 21, 2022.

Notice of Preliminary Rejection from Korean Patent Application No. 10-2022-0065824, dated Dec. 4, 2023, pp. 1-10 (includes English Translation).

* cited by examiner

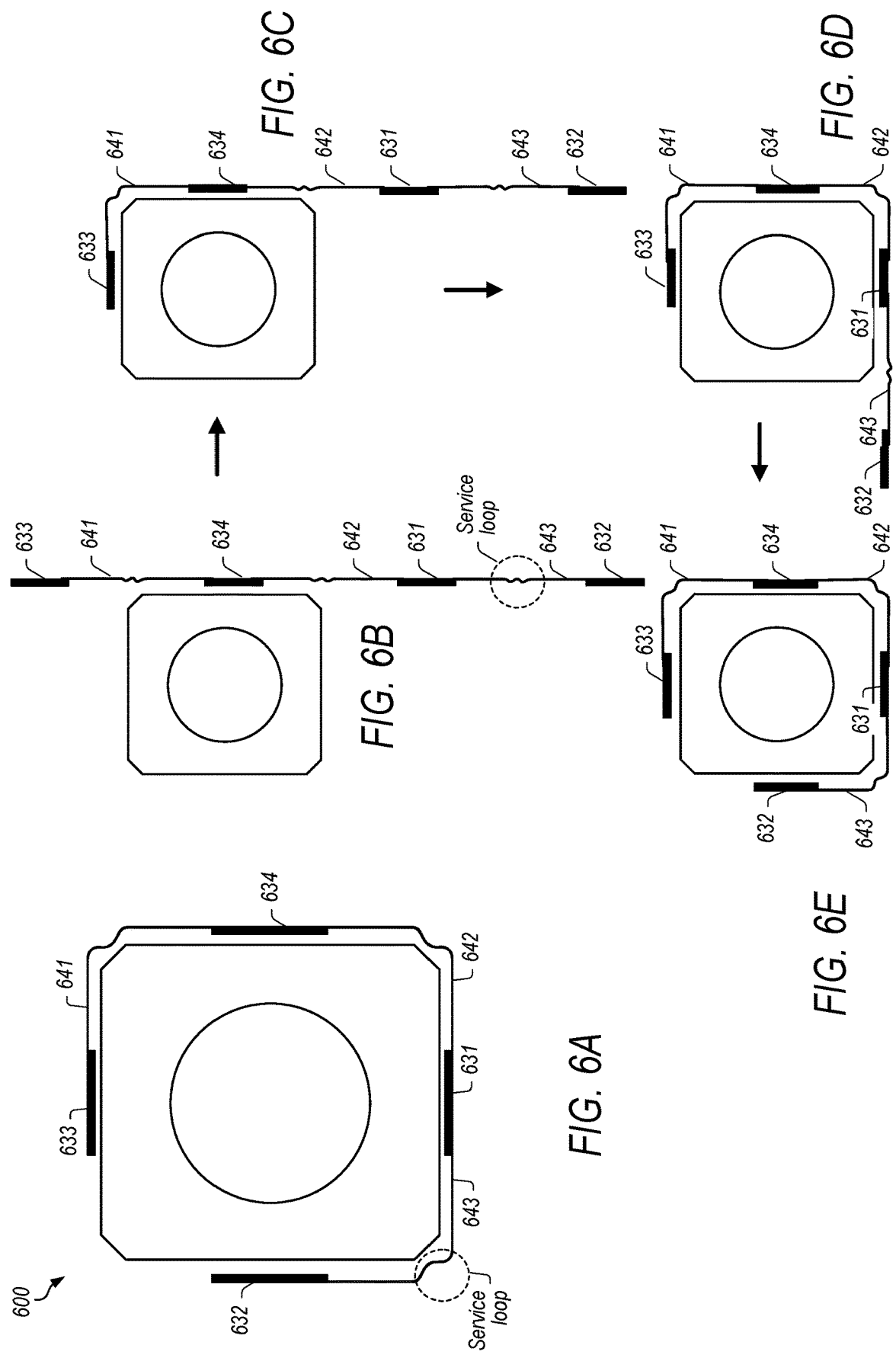

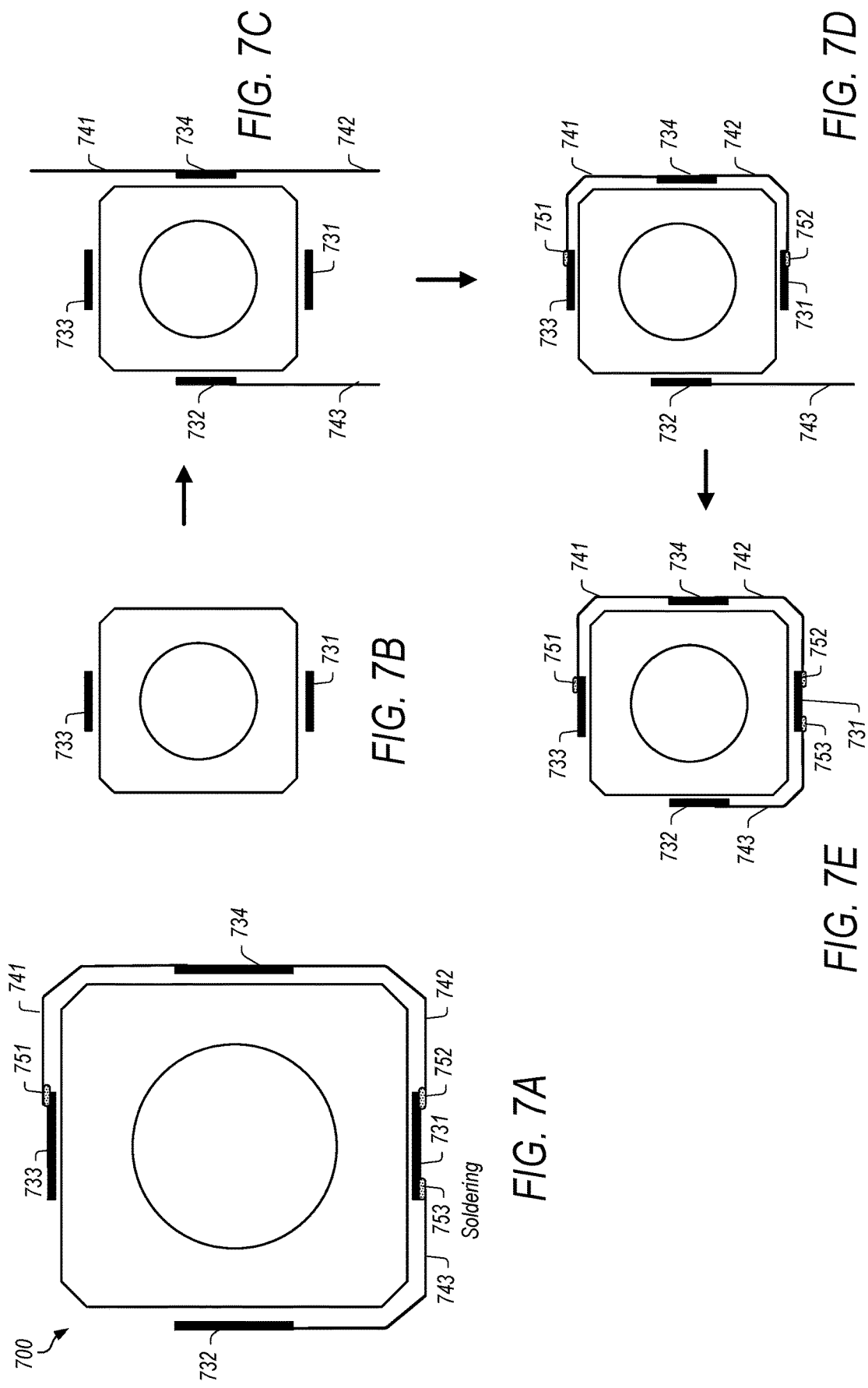

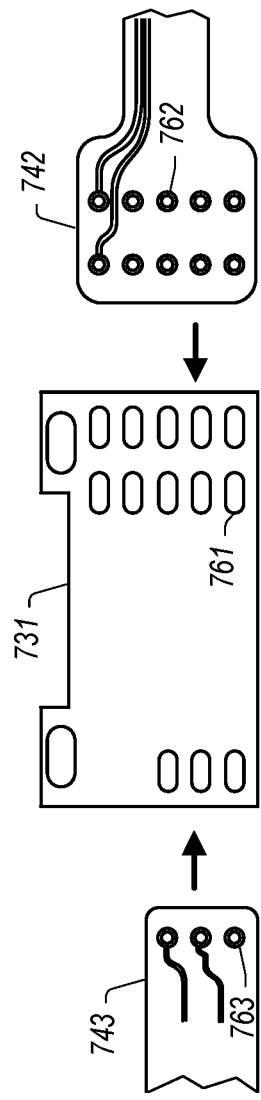
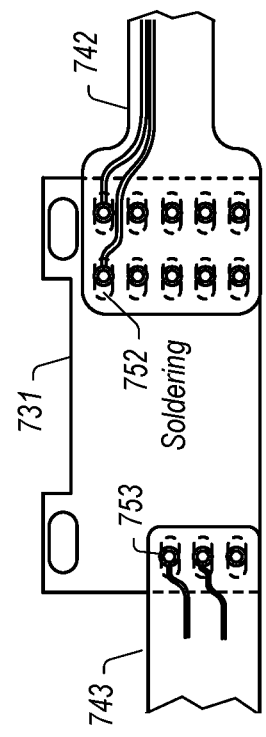
FIG. 8A
FIG. 8B

CAMERA WITH TILT COMPENSATION

This application claims benefit of priority to U.S. Provisional Application Ser. No. 63/217,256, entitled "Camera with Tilt Compensation," filed Jun. 30, 2021, and which is hereby incorporated herein by reference in its entirety.

BACKGROUND

Technical Field

This disclosure relates generally to a camera and more specifically to a camera with tilt compensation.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. The camera may include at least one optical lens that passes through light to an image sensor to generate imaging signals, based on which an image may be produced. Therefore, the image quality of the camera depends heavily on the spatial alignment between the optical lens and the image sensor. Misalignment, such as tilt, between the lens and image senor can cause negative impact on the image quality, such as unexpected sharpness variation across an image. Therefore, it is desirable for cameras to have the capability to compensate for the tilt.

BRIEF DESCRIPTION OF THE DRAWINGS

FIGS. 6A-6E show an example process to form fixtures for tilt coils, according to some embodiments.

FIGS. 7A-7E show another example process to form fixtures for tilt coils, according to some embodiments.

FIGS. 8A-8B show an example embodiment for connecting a rigid circuit board and a flexible circuit, according to some embodiments.

Figure 1A:
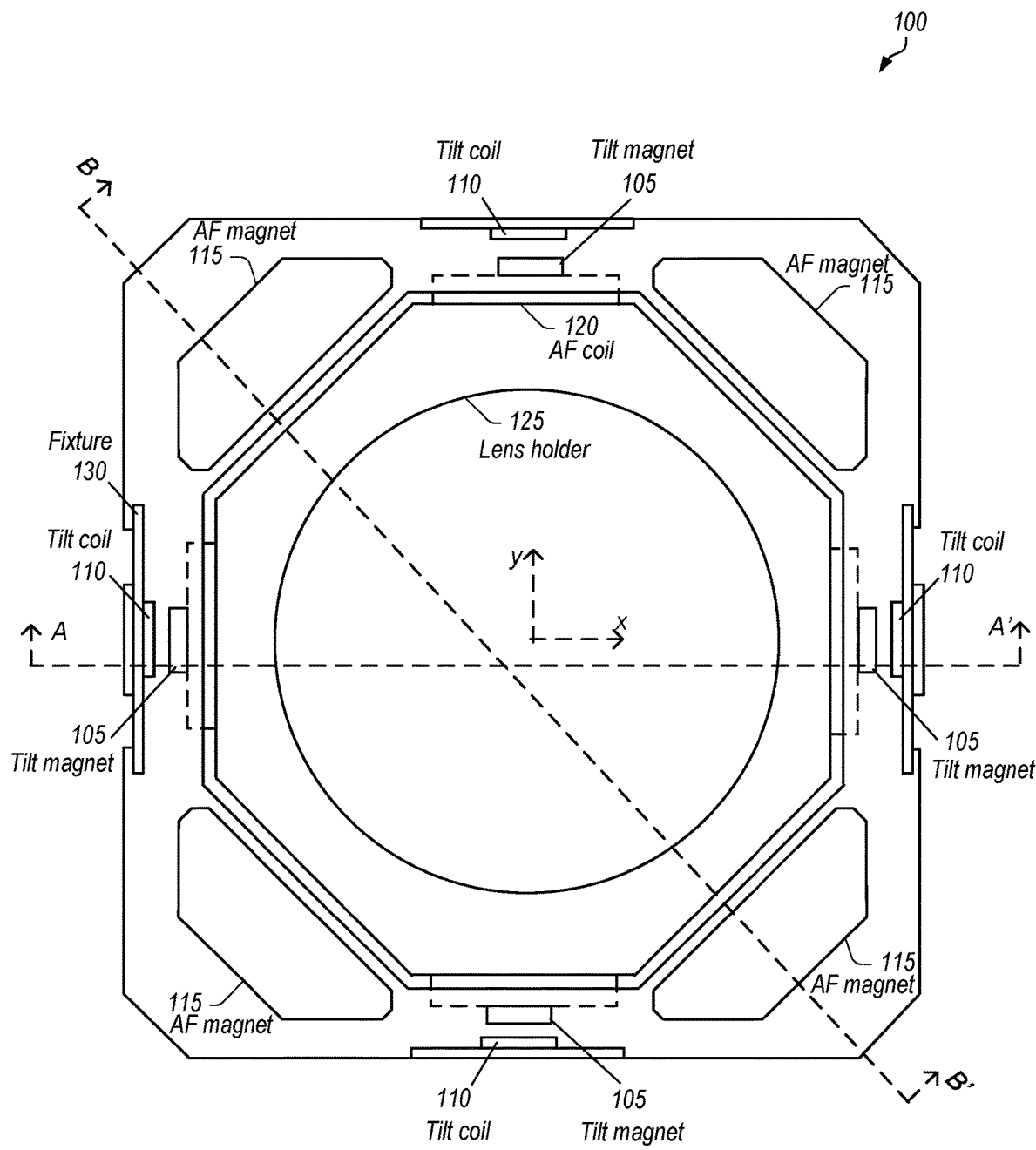
FIGS. 1A-1C illustrate an example camera with tilt compensation, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the"

are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a camera with tilt compensation. In some embodiments, the camera may include one or more lenses and an image sensor. The lenses may pass through light to the image sensor to generate imaging signals, which may be further processed by a processor to produce an image. In some embodiments, the camera may include a tilt actuator, e.g., a voice coil motor (VCM) actuator, that may cause tilt movement of the lenses relative to the image sensor. For instance, the lenses may be rotated approximately around one or more axis (e.g., X- and/or Y-axis) orthogonal to an optical axis (or Z-axis) of the lenses relative to the image sensor. In some embodiments, the tilt actuator may include one or more tilt magnets and one or more tilt coils. In some embodiments, the tilt magnets may be fixedly coupled with the lenses, e.g., through attachment with a lens holder of the lenses, whilst the tilt coils may be fixedly coupled with one or more stationary fixtures of the camera. Here, the term "stationary" may broadly refer to a component of the camera that is not supposedly to move. A stationary component may still experience unexpected movement, e.g., during sudden drop of the camera. However, such unexpected movement is not purposeful and especially is not caused by an actuator. In some embodiments, the camera with tilt compensation may be part of a mobile multipurpose device such as a smartphone, a tablet, a pad device, and the like.

In some embodiments, the tilt magnets and tilt coils may generate motive force (e.g., Lorentz force) to tilt the lenses (e.g., through rotation around X- and/or Y-axis) or autofocus the lenses (e.g., through movement in a direction approximately parallel to Z-axis) relative to the image sensor of the camera. In addition, the camera may include one or more actuators, e.g., one or more VCM actuators, separate from the tilt actuator and dedicated to perform autofocus (AF) and/or optical image stabilization (OIS) functions. For instance, the camera may include an AF actuator primarily used to move the lenses relative to the image sensor along the optical axis (or Z-axis) of the lenses, and an OIS actuator to move the image sensor relative to the lenses in one or more directions approximately in the X-Y plane orthogonal to the optical axis (or Z-axis) of the lenses. Alternatively, in some embodiments, the AF and OIS functions may be implemented by moving either the lenses or the image sensor alone. For instance, in some embodiments, the image sensor may be movable relative to the lenses along (1) the optical axis (or Z-axis) and (2) one or more axes (e.g., X- and/or Y-axis) orthogonal to the optical axis (or Z-axis) of the lenses and the lenses may remain stationary, or vice versa.

The tilt actuator described in this disclosure provides several benefits. One, the tilt actuator may move the lenses to one or more desired tilt positions, e.g., according to measurement of one or more tilt sensors, to accurately compensate for unexpected tilt and misalignment between the lenses and image sensor, thus greatly improving the image quality for the camera. Two, the tilt actuator may operate independently from the AF and/or OIS actuator(s) of the camera, thus minimizing potential interference with the camera's AF and/or OIS functions. Three, the tilt in a camera generally has only a relatively small value. Therefore, its compensation may only require a relatively low-power tilt actuator. The tilt actuator may be implemented using relatively simple and small form factor components, resulting in minimal mass and size additions to the camera.

Figure 1B:
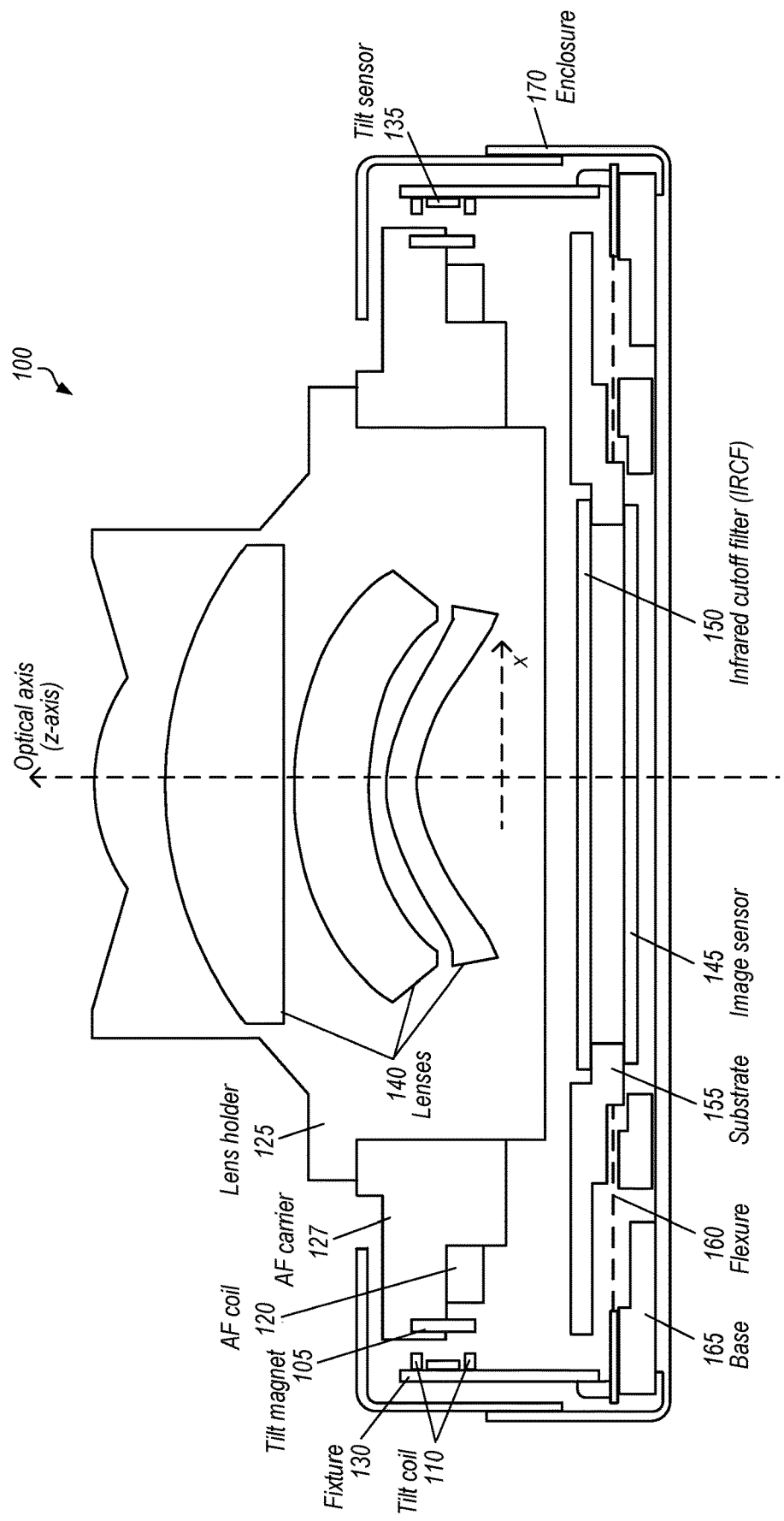
Figure 1C:
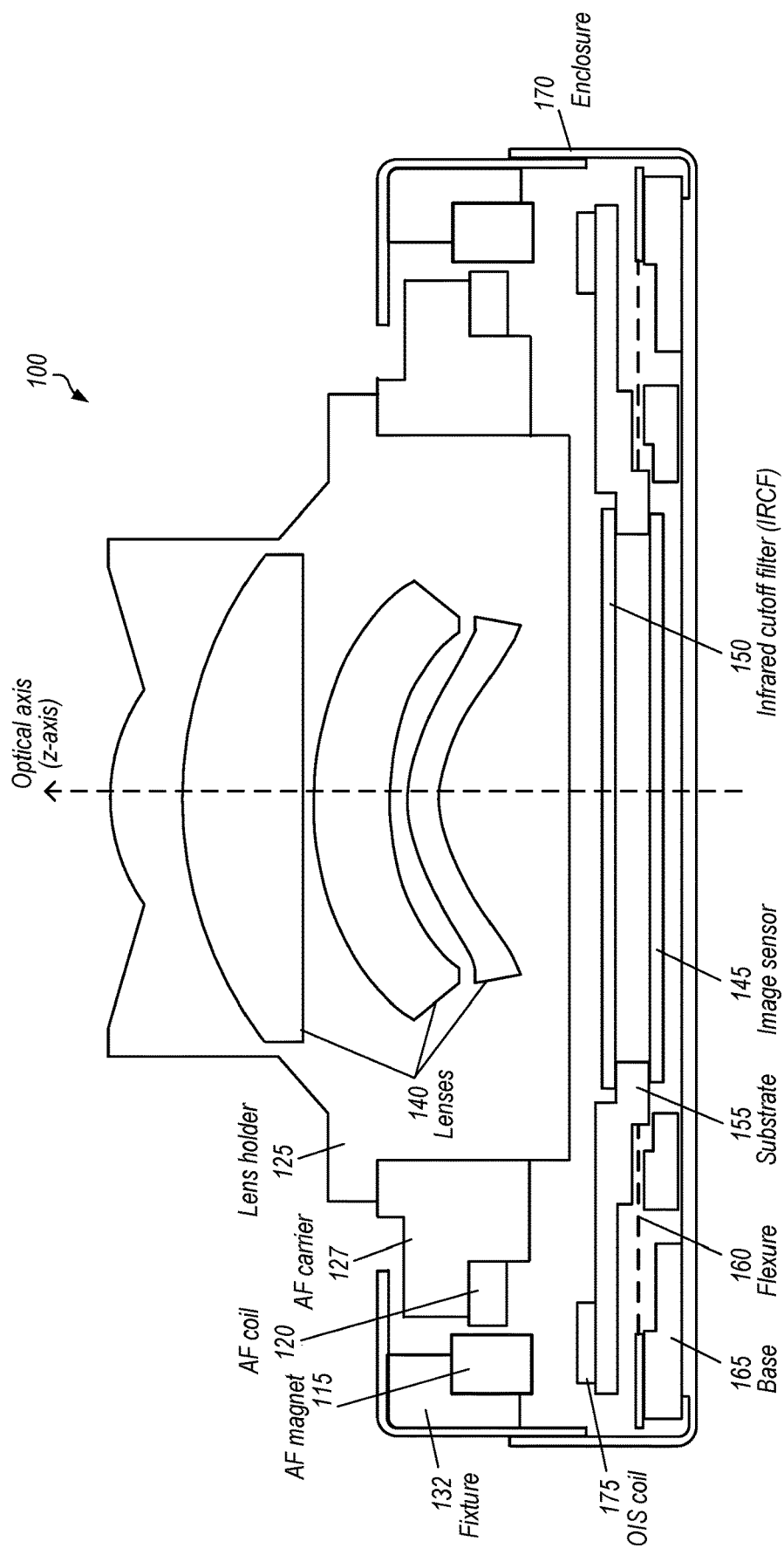

FIGS. 1A-1C illustrate an example camera with tilt compensation, according to some embodiments. To simplify illustration, only relevant components are illustrated in these figures. For purposes of illustration, this disclosure defines Z-axis as the optical axis of one or more lenses that passes through the lenses in a direction perpendicular to an image sensor of the camera. In the top view of FIG. 1A, in this example, camera 100 may include a tilt actuator having one or more tilt magnets 105 and one or more tilt coils 110. In some embodiments, tilt magnets 105 and tilt coils 110 may be arranged surrounding a periphery of the lenses of camera 100. For purposes of illustration, the lenses and image sensor of camera 100 are not shown in FIG. 1A, and illustrated in the cross-sectional views in FIGS. 1B-1C. For instance, camera 100 may have an approximately rectangular shape, as shown in FIG. 1A. Tilt magnets 105 and tilt coils 110 may respectively be distributed approximately evenly around a perimeter of the lenses of camera 100—e.g., two tilt magnets positioned opposite each other at west and east sides along X-axis, and other two tilt magnets placed opposite each other at north and south sides along Y-axis, with four tilt coils each proximate a corresponding tilt magnet.

In some embodiments, tilt magnets 105 may be fixedly coupled with the lenses of camera 100. For instance, in some embodiments, camera 100 may include lens holder 125 that may securely hold the lenses of camera 100. Tilt magnets 105 may be attached with lens holder 125, directly or indirectly, thus becoming fixedly coupled and movable together with the lenses of camera 100. In some embodiments, tilt coils 110 may be fixedly coupled with one or more stationary fixtures 130 of camera 100. For instance, fixtures 130 may include one or more circuit boards arranged vertically approximately in the X-Z or Y-Z plane that may be further attached with a stationary base of camera 100.

In addition, in some embodiments, camera 100 may include dedicated AF and/or OIS actuator(s). In some embodiments, the AF and/or OIS actuator(s) may be separate from the tilt actuator described above. For instance, in FIG. 1A, camera 100 may include an AF actuator having one or more AF magnets 115 and one or more AF coils 120. In this example, AF magnets 115 may be stationarily positioned at four corners of camera 100, e.g., through attachment with a stationary base of camera 100. AF coils 120 may be attached with lens holder 125 and thus fixedly coupled with lenses 140 of camera 100 and thus may move together with the lenses. As shown in FIG. 1A, AF coils 120 may be wound in an approximately hexagon shape around a perimeter of the lenses of camera 100 in X-Y plane orthogonal to the optical axis (or Z-axis) of the lenses of camera 100. The current flowing through AF coils 120 may be regulated such that the current may interact with the magnetic fields of AF magnets 115 to generate motive force (e.g., Lorentz force) in a direction parallel to the optical axis (or Z-axis) to move lenses 140 relative to image sensor 145 to perform the AF function.

FIG. 1B shows a cross-sectional view of camera 100 from the perspective A-A' as indicated in FIG. 1A. As shown in the figure, in some embodiments, camera 100 may include one or more lenses 140 that may pass through light to image sensor 145 that may generate imaging signals (e.g., light activated electrical signals) to be further processed to produce an image. In some embodiments, camera 100 may include infrared cutoff filter (IRCF) 150 positioned optically between lenses 140 and image sensor 145 such that IRCF 150 may block at least some infrared light from reaching image sensor 145. In some embodiments, image sensor 145 and IRCF 150 may be attached to substrate 155. As described above in FIG. 1A, in some embodiments, tilt magnets 105 may be fixedly coupled with lenses 140. For instance, in FIG. 1B, tilt magnets 105 may be attached with AF carrier 127 that may be further attached to lens holder 125. Thus, tilt magnets 105, AF carrier 127, lens holder 125, and lenses 140 collectively may be considered a single rigid body that may be movable altogether relative to image sensor 145. In some embodiments, camera 100 may include one or more suspension structures (not shown), such that lenses 140 may be able to move relative to image sensor 145. For instance, in some embodiments, camera 100 may include one or more springs connecting AF carrier 127 with a stationary portion of camera 100 (e.g., fixture 132). The springs may be compressed or stretched to allow lenses 140 (contained within lens holder 125) to move along Z-axis, and/or rotate around X- and/or Y-axis, relative to image sensor 145. In addition, tilt coils 110 may be fixedly coupled with one or more fixtures 130 that may be further attached with stationary base 165 and enclosure 170 of camera 100. Thus, tilt coils 110, fixture 130, base 165, and enclosure 170 collectively may be considered a stationary reference point.

In some embodiments, the tilt actuator of camera 100 may include one or more tilt sensors 135, e.g., attached to fixtures 130, as shown in FIG. 1B. Tilt sensors 135 may measure relative distance, position, speed, and/or proximity between tilt magnets 105 and tilt coils 110, which may be used to detect unexpected tilt between lenses 140 and image sensor 145 and determine a tilt position for tilt lenses 140 to compensate for the unexpected tilt. In some embodiments, current of tilt coils 110 may be regulated, e.g., using a controller or driver of the tilt actuator, according to the feedback from tilt sensors 135. The current of tilt coils 110 may interact with magnetic field of tilt magnets 105 to generate motive force to tilt lenses 140 (and tilt magnets 105) (e.g., to rotate lenses 140 approximately around X- and/or Y-axis) relative to image sensor 145. In addition, in some embodiments, tilt coils 110 and tilt magnets 105 may generate motive force to move lenses 140 (and tilt magnets 105) relative to image sensor 145 in a direction approximately parallel to Z-axis to adjust the focus for camera 100.

FIG. 1C shows a cross-sectional view of camera 100 from the perspective B-B' as indicated in FIG. 1A. As shown in the figure, in some embodiments, camera 100 may include one or more AF magnets 115 and one or more AF coils 120. In FIG. 1C, AF magnets 115 may be fixedly coupled with one or more stationary fixtures 132, which may be further attached with enclosure 170 of camera 100. In addition, AF coils 120 may be fixedly coupled with lenses 140, e.g., through AF carrier 127 and lens holder 125, as shown in FIG. 1C. The current flowing through AF coils 120 may be controlled to interact with AF magnets 115 to move lenses 140 (and AF coil 120) relative to image sensor 145 in a direction approximately parallel to the optical axis (or Z-axis) of lenses 140 to implement the AF function.

In addition, in some embodiments, camera 100 may include one or more OIS coils 175. In FIG. 1C, OIS coils 175 may be attached to substrate 155 and thus fixedly coupled with image sensor 145. In some embodiments, substrate 155 may be flexibly coupled with stationary base 165 through flexure 160. Flexure 160 may provide substrate 155 (and image sensor 145) necessary mechanical support, but also motion freedom in one or more directions (e.g., X- and/or Y-axis) approximately orthogonal to the optical axis (or Z-axis) of lenses 140. Thus, OIS coil 175 may conduct regulated current to interact with corresponding magnets, e.g., AF magnets 115, to move image sensor 145 relative to lenses 140 along X- and/or Y-axis, thus providing an OIS function.

Note that FIGS. 1A-1C are merely examples for purposes of illustration. In some embodiments, the arrangement of tilt magnets 105, tilt coils 110, AF magnets 115, and/or AF coils 120 may be different from FIGS. 1A-1C. For instance, in some embodiments, tilt magnets 105 and tilt coils 110 may be "reversed" such that tilt magnets 105 may become stationary whilst tilt coils 110 may be fixedly coupled and movable together with lenses 140. Similarly, in some embodiments, AF magnets 115 may be movable together with lenses 140 whilst AF coils 120 may be stationarily positioned. In addition, in some embodiments, camera 100 may include magnet(s) separate from AF magnets 115 for implementing the OIS function. Furthermore, in some embodiments, the AF and OIS functions may be implemented by moving lenses 140 (or image sensor 145) alone, while the other component (e.g., image sensor 145 (or lenses 140)) may remain stationary. In addition, tilt coils 110, AF coils 120, and/or OIS coils 175 are not limited to a specific type of coil. Instead, in some embodiments, they may individually include coil(s) in different types, including solenoid, flat coil, multilayer solenoid or flat coils, etc.

Figure 2A:
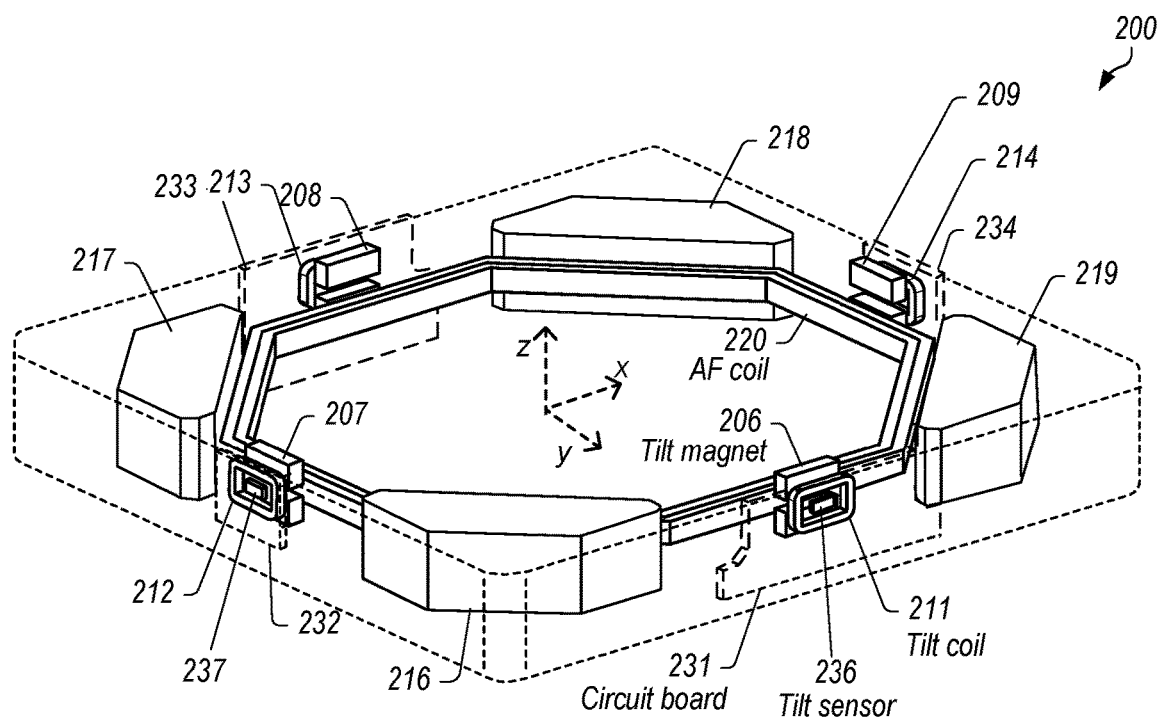
FIGS. 2A-2B show perspective views of an example camera with tilt compensation, according to some embodiments.
Figure 2B:
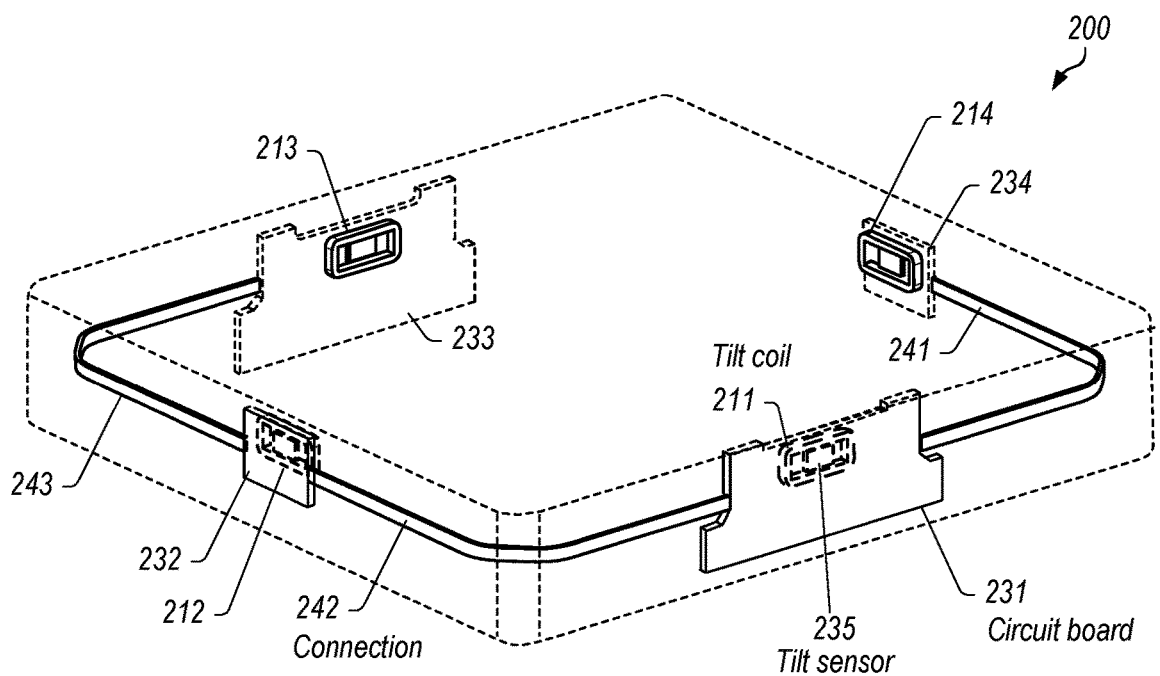

FIGS. 2A-2B show perspective views of an example camera with tilt compensation, according to some embodiments. For purposes of illustration, only relevant components are illustrated in these figures. In FIG. 2A, camera 200 may include one or more tilt magnets 206, 207, 208, and 209 and one or more tilt coils 211, 212, 213, and 214, which may be arranged surrounding a periphery of one or more lenses of camera 200. For instance, two tilt magnets 207 and 209 may be positioned opposite each other along one axis (e.g., X-axis) orthogonal to an optical axis (or Z-axis) of the lenses, whilst other two tilt magnets 206 and 208 may be placed opposite each other along another axis (e.g., Y-axis) orthogonal to the optical axis (or Z-axis) of the lenses, with tilt coils 211, 212, 213, and 214 each proximate one corresponding tilt magnet.

In some embodiments, tilt magnets 206, 207, 208, and 209 may be fixedly coupled with the lenses of camera 200. Tilt coils 211, 212, 213, and 214 may be fixedly coupled with one or more stationary fixtures of camera 200. For instance, in FIG. 2A, the fixtures may include four circuit boards 231, 232, 233, and 234 that may individually be arranged vertically in a plane (e.g., X-Z or Y-Z plane) in parallel to the optical axis (or Z-axis) of the lenses of camera 200. For purposes of illustration, circuit boards 231, 232, 233, and 234 are shown by dashed lines in FIG. 2A. Tilt coils 211, 212, 213, and 214 may individually be attached to circuit board 231, 232, 233, and 234, laid in the plane in parallel to Z-axis, facing a corresponding tilt magnet. In addition, in some embodiments, camera 200 may include one or more tilt sensors (e.g., position sensors) 236, 237, 238, and 239 (not visible in FIG. 2A). In FIG. 2A, tilt sensors 236, 237, 238, and 239 may individually be attached to circuit boards 231, 232, 233, and 234 inside a corresponding tilt toil. Further, camera 200 may include one or more AF magnets 216, 217, 218, and 219 and AF coils 220, arranged surrounding a perimeter of the lenses of camera 200. In FIG. 2A, AF magnets 216, 217, 218, and 219 may be positioned stationarily at four corners of camera 200.

FIG. 2B provides a further view of the stationary fixtures for tilt coils 211, 212, 213, and 214. In some embodiments, the stationary fixtures may include one or more connections 241, 242, and 243 (e.g., flexible circuits) that may connect individual circuit boards 231, 232, 233, and 234 (e.g., rigid circuit boards) such that they collectively may form one single fixture surrounding a periphery of the lenses of camera 200.

Figure 2C:
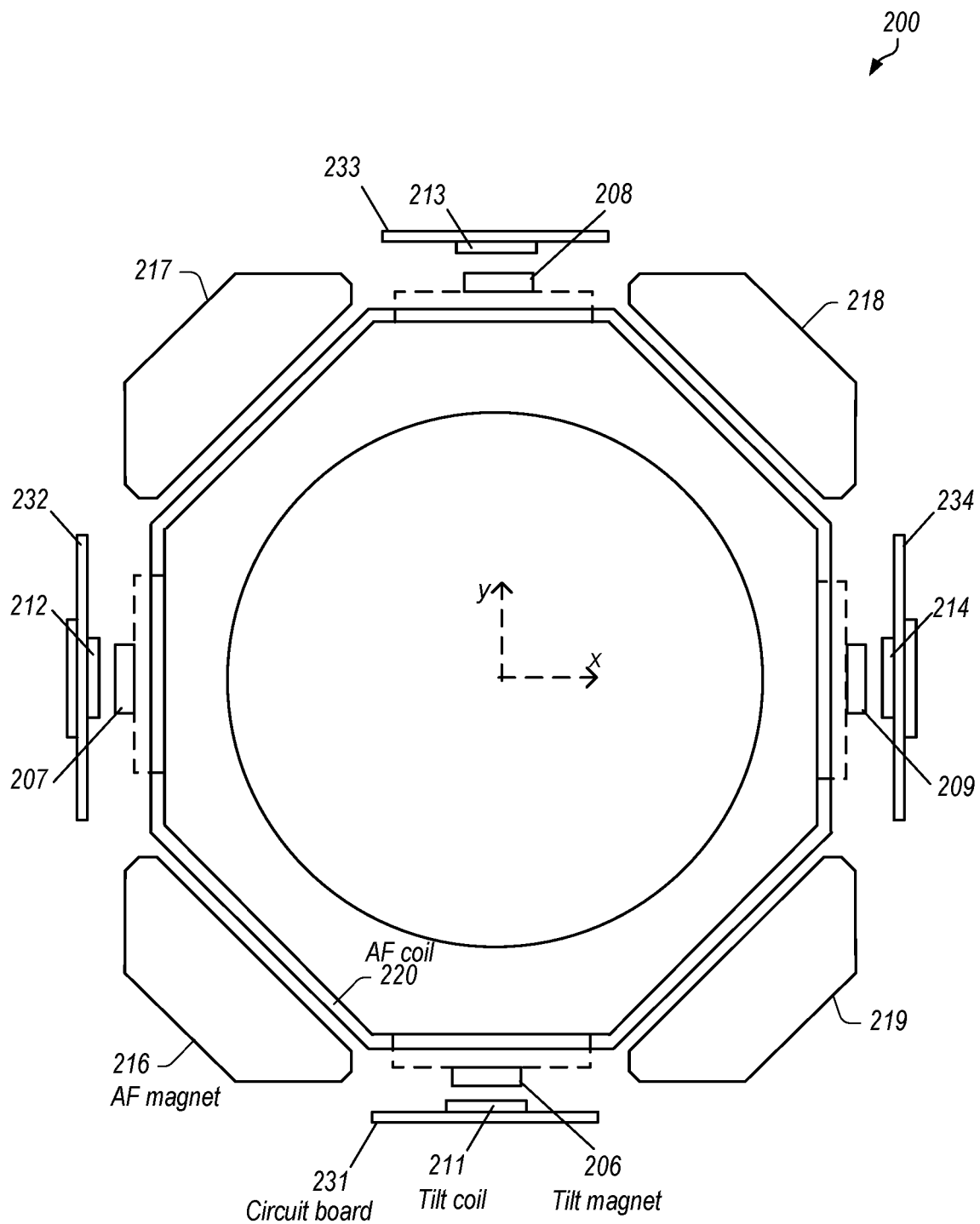
FIGS. 2C-2D show top views of an example camera with tilt compensation, according to some embodiments.

FIG. 2C shows a top view of camera 200. As shown in FIG. 2C, two tilt magnets 207 and 209 (and corresponding tilt coils 212 and 214) may be positioned opposite each other along X-axis, whilst other two magnets 206 and 208 (and corresponding tilt coils 211 and 213) may be positioned opposite each other along Y-axis. AF magnets 216, 217, 218, and 219 may be positioned at the four corners, approximately 45 degrees from tilt magnets 206, 207, 208, and 209. AF coils 220 may be wound around a peripheral of the lenses of camera 200 approximately in a plane (e.g., X-Y plane) orthogonal to the optical axis (or Z-axis) of the lenses of camera 200.

Figure 2D:
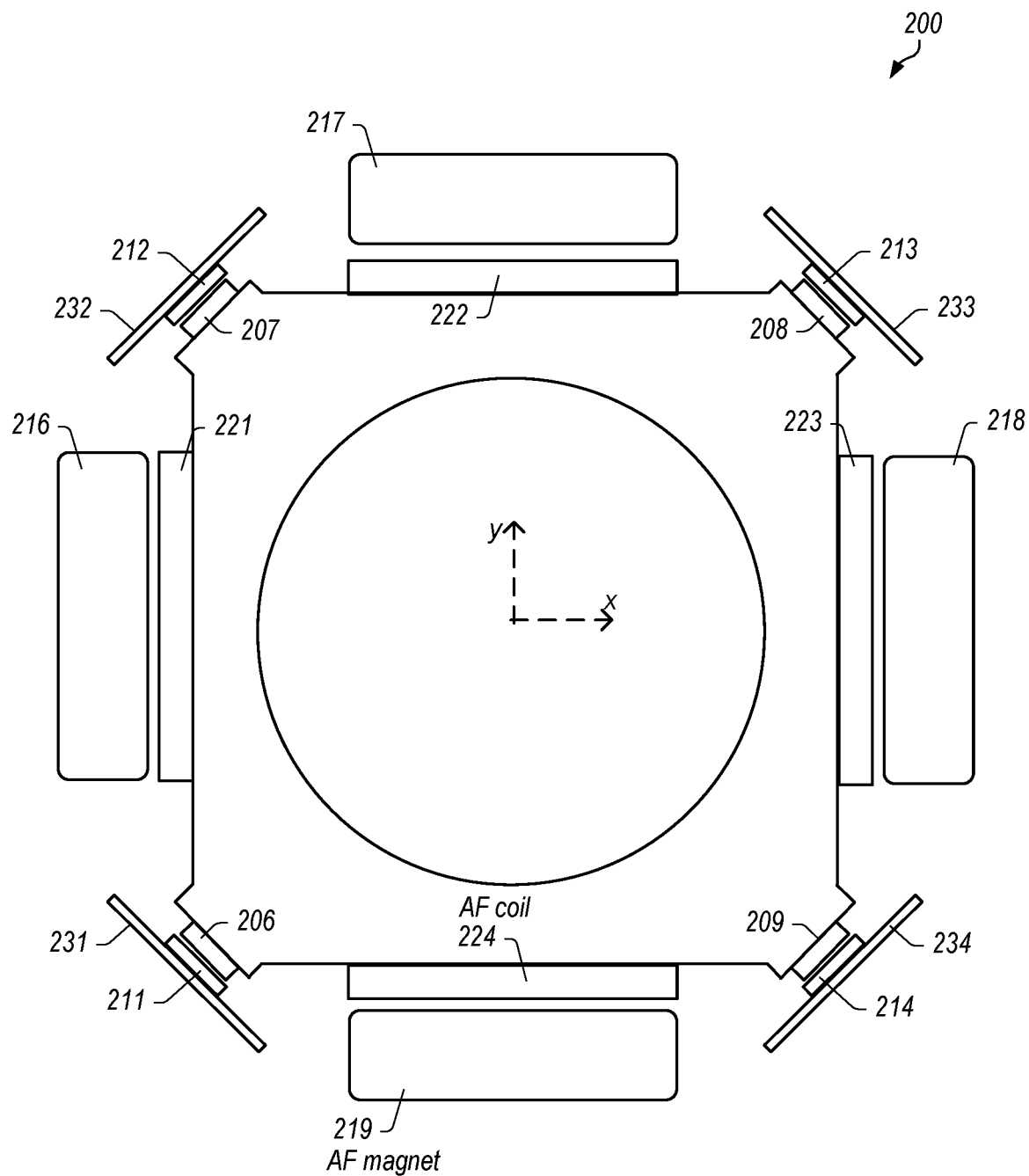

FIG. 2D shows another example design for camera 200, according to some embodiments. By comparison to FIG. 2C, in FIG. 2D, tilt magnets 206, 207, 208, and 209 and corresponding tilt coils 211, 212, 213, and 214 may be positioned at four corners of camera 200, whilst AF magnets 216, 217, 218, and 219 may be moved to X- and Y-axes. In addition, camera 200 may include four separate AF coils 211, 212, 213, and 214, rather than one connected coil 220 in FIG. 2A, each laid in a plane (e.g., X-Z or Y-Z plane) parallel to the optical axis (or Z-axis) of the lenses of camera 200, proximate a corresponding AF magnet.

Figure 3A:
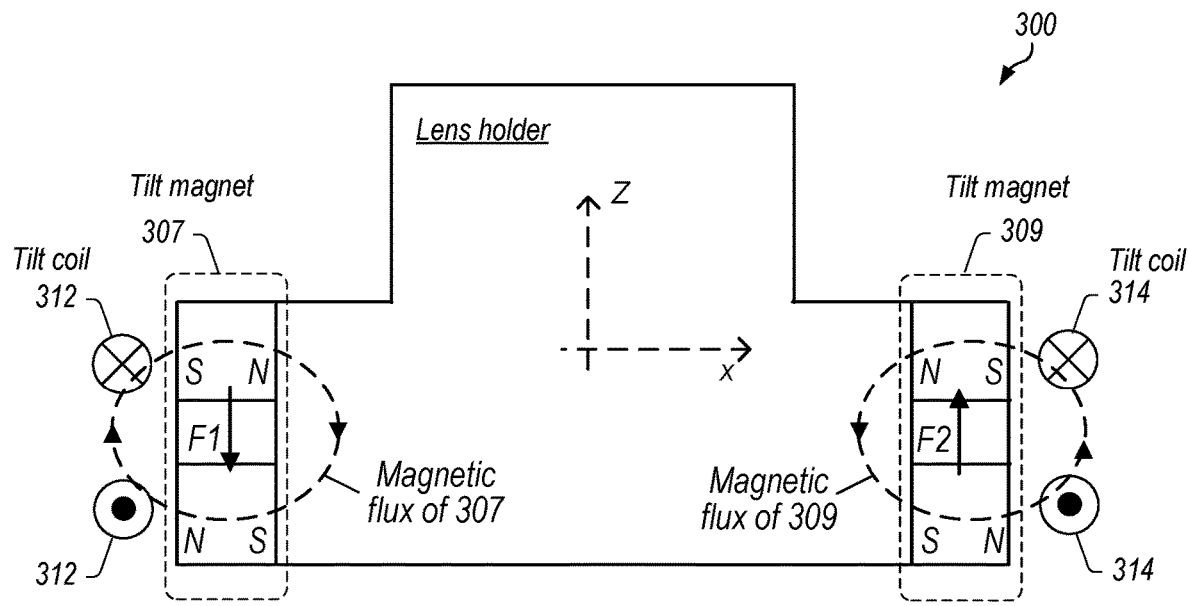
FIGS. 3A-3B show operations of an example tilt actuator, according to some embodiments.
Figure 3B:
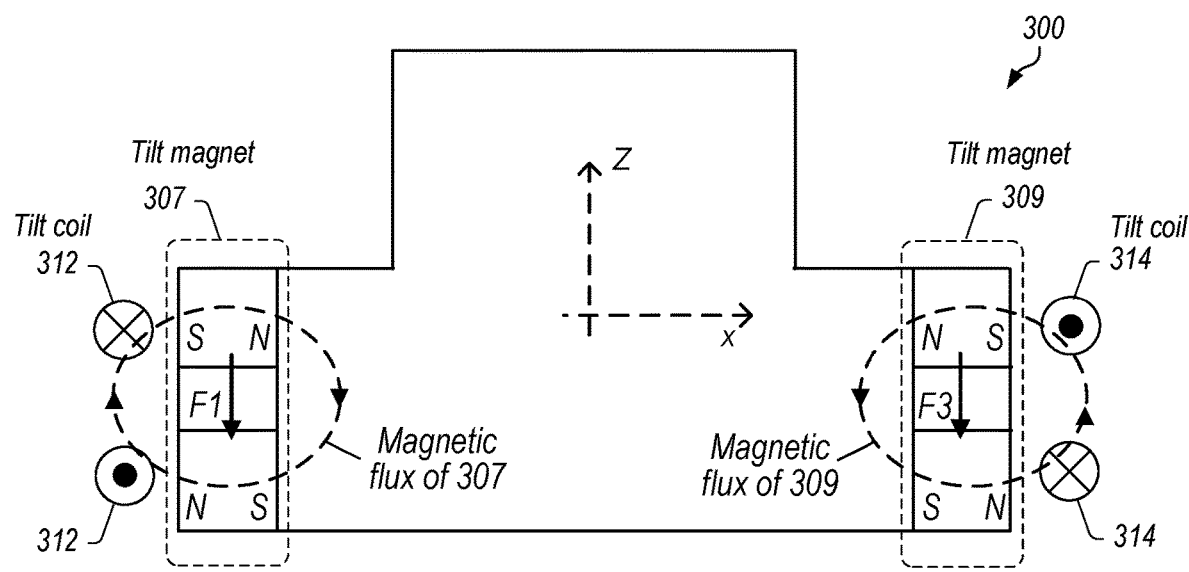

In some embodiments, tilt magnets 206, 207, 208 and 209 (and corresponding tilt coils 211, 212, 213, and 214) of camera 200 may operate in pairs. For instance, two tilt magnets 207 and 209 (and corresponding tilt coils 212 and 214) along X-axis in FIGS. 1-2 may operate as one pair to rotate the lenses of camera 200 approximately around Y-axis, whilst other two tilt magnets 206 and 208 (and corresponding tilt coils 211 and 213) along Y-axis may operate in another pair to rotate the lenses of camera 200 approximately around X-axis. FIGS. 3A-3B show operations of a pair of tilt magnets (and corresponding tilt coils), according to some embodiments. In FIG. 3A, two tilt magnets 307 and 309 (e.g., like tilt magnets 207 and 209 in FIG. 2) may be positioned opposite each other along X-axis, with tilt coils 312 and 314 (e.g., like tilt magnets 212 and 214 in FIG. 2) each proximate one corresponding tilt magnet. Tilt magnet 307 and 309 may individually include one dual-pole magnet that includes top and bottom portions each polarized in opposite directions with a transition zone in-between. For instance, as shown in FIG. 3A, tilt magnet 307 (and 309) may include a top portion and a top portion, where each of the top and bottom portions may include opposite polarities (e.g., south and north polarities). Tilt magnets 307 and 309 may individually generate a magnetic field with a direction indicated by the dashed lines in FIG. 3A. For instance, tilt magnets 307 and 309 may individually face a direction (e.g., along X-axis) approximately orthogonal to the optical axis (or Z-axis) of camera 300, such as the magnetic flux proximate tilt magnets 307 and 309 face a direction (e.g., along X-axis) approximately orthogonal to the optical axis (or Z-axis) of the lenses of camera 300.

Direction of the current flowing through tilt coils 312 and 314 are indicated by the cross (x) and dot (•) symbols. In this disclosure, the cross (x) means current flowing out of the paper, whilst the dot (•) means current flowing into the paper. Therefore, the electromagnetic interaction between tilt magnet 307 and tilt coil 312 may generate motive force (e.g., Lorentz force) on tilt coil 312 approximately in the positive direction of Z-axis and counter-acting force F1 on tilt magnet 307 approximately in the negative direction of Z-axis, as indicated in FIG. 3A. Similarly, tilt magnet 309 and tilt coil 314 may interact to generate motive force F2 (e.g., counterpart to a Lorentz force) on tilt magnet 309 approximately in the positive direction of Z-axis. Given that tilt magnets 307 and 309 may be fixedly coupled with one or more lenses of camera 300, motive force F1 and F2 (in opposite directions), in combination, may rotate the lenses approximately counter-clockwise around Y-axis relative to an image sensor of camera 300. Note that values and/or polarities of the current of tilt coils 312 and/or 314 may be regulated such that values and/or directions of motive force F1 and/or F2 can be controlled as well. For instance, the polarities of the current of tilt coils 312 and 314 may be reversed to rotate the lenses approximately clockwise around Y-axis relative to the image sensor of camera 300.

In addition, as described above, camera 300 may include further tilt magnets and tilt coils (e.g., tilt magnets 206 and 208, and tilt coils 211 and 213) arranged around another axis (e.g., Y-axis) orthogonal to the optical axis (Z-axis). The additional tilt magnets and tilt coils may operate in a similar manner to rotate the lenses around another axis (e.g., counter-clockwise or clockwise around X-axis) relative to the image sensor of camera 300. In short, the lenses may rotate around one or more axes (e.g., X- and/or Y-axis), counter-clockwise or clockwise, orthogonal to the optical axis (e.g., Z-axis) relative to the image sensor of camera 300. The rotation of the lenses may compensate for unexpected tilt between the lenses and the image sensor.

In FIG. 3B, the polarity of the current of tilt coil 314 may be reversed to flow in an opposite direction such that it may interact with tilt magnet 309 to generate motive force F3 on tilt magnet 309 in a same direction as the motive force F1 on tilt magnet 307, e.g., in a direction approximately parallel to Z-axis. As a result, the combination of motive force F1 and F3 (in a same direction) may move the lenses relative to the image sensor of camera 300 in the negative direction of Z-axis. Similarly, the polarity of the current of tilt coil 312 may be changed to move the lenses in the positive direction of Z-axis. The movement of the lenses relative to the image sensor along Z-axis may adjust the focus for camera 300, thus performing or supplementing the autofocus function (e.g., of a separate AF actuator).

Figure 4:
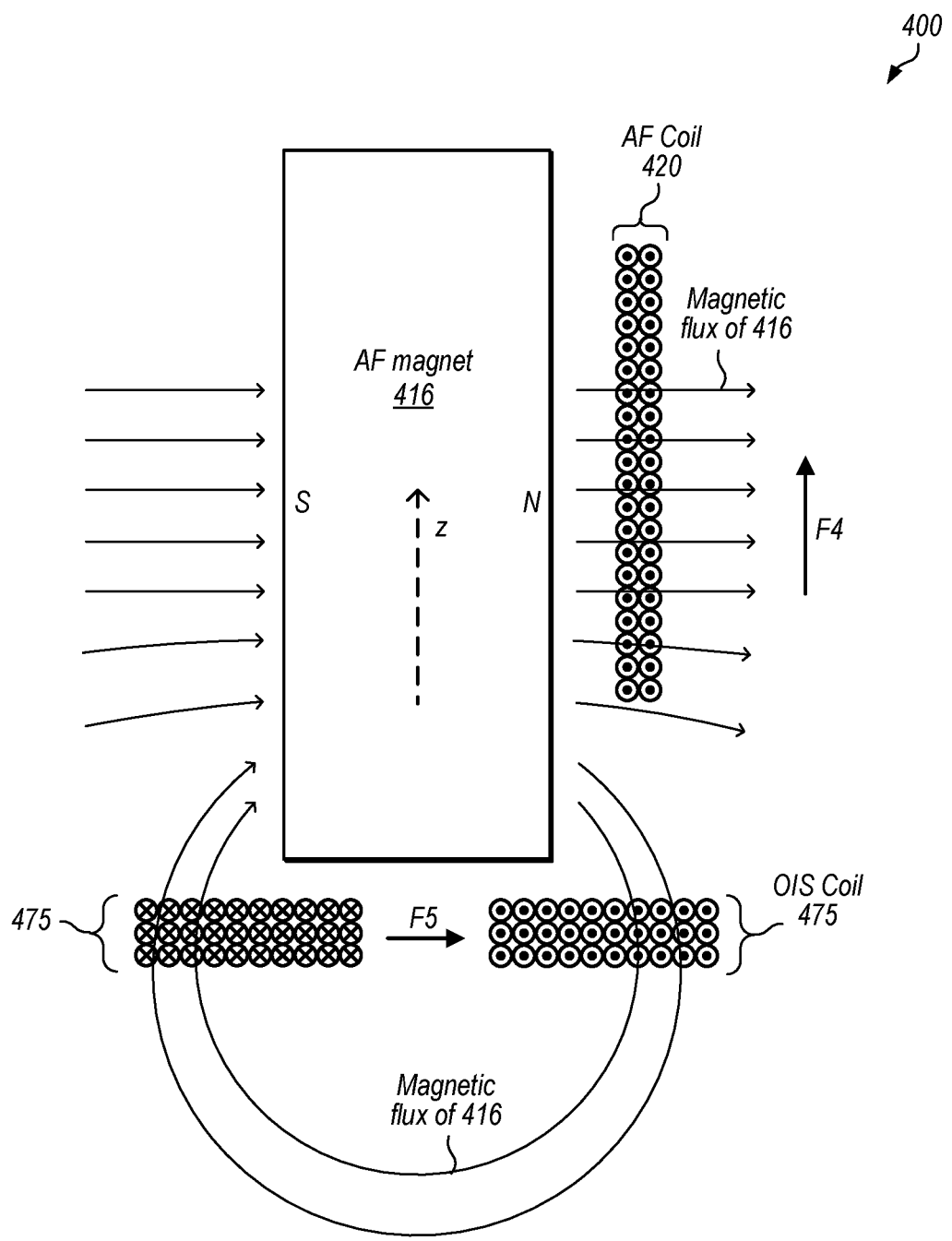
FIG. 4 shows operations of an example autofocus (AF) and optical image stabilization (OIS) actuator, according to some embodiments.

FIG. 4 shows operations of AF and OIS actuators, according to some embodiments. In FIG. 4, camera 400 may include AF magnet 416 (e.g., like AF magnet 216 in FIG. 2), AF coil 420 (e.g., like AF coil 220 in FIG. 2), and OIS coil 475 (e.g., like OIS coil 175 in FIG. 1). AF coil 420 and OIS coil 475 may respectively conduct regulatable current, which may interact with the magnetic field of AF magnet

416 to generate motive force F4 (e.g., Lorentz force) on AF coil 420 and motive force F5 (e.g., Lorentz force) on OIS coil 475, as indicated in FIG. 4. Because AF coil 420 may be fixedly coupled with one or more lenses of camera 400 (as described above), the motive force F4 may move the lenses (and AF coil 420) relative to the image sensor in a direction approximately parallel to an optical axis (or Z-axis) of the lenses of camera 400 and thus implement the AF function. In addition, OIS coil 475 may be fixedly coupled with the image sensor (as described above), and thus the motive force F5 may move the image sensor (and OIS coil 475) relative to the lenses in a direction approximately orthogonal to the optical axis (or Z-axis) of the lenses of camera 400 and implement the OIS function. Similarly, values and/or polarities of the current of AF coil 420 and/or OIS coil 475 may be regulated such that amplitudes and/or directions of the motive force F4 and F5 may be controlled.

Figure 5A:
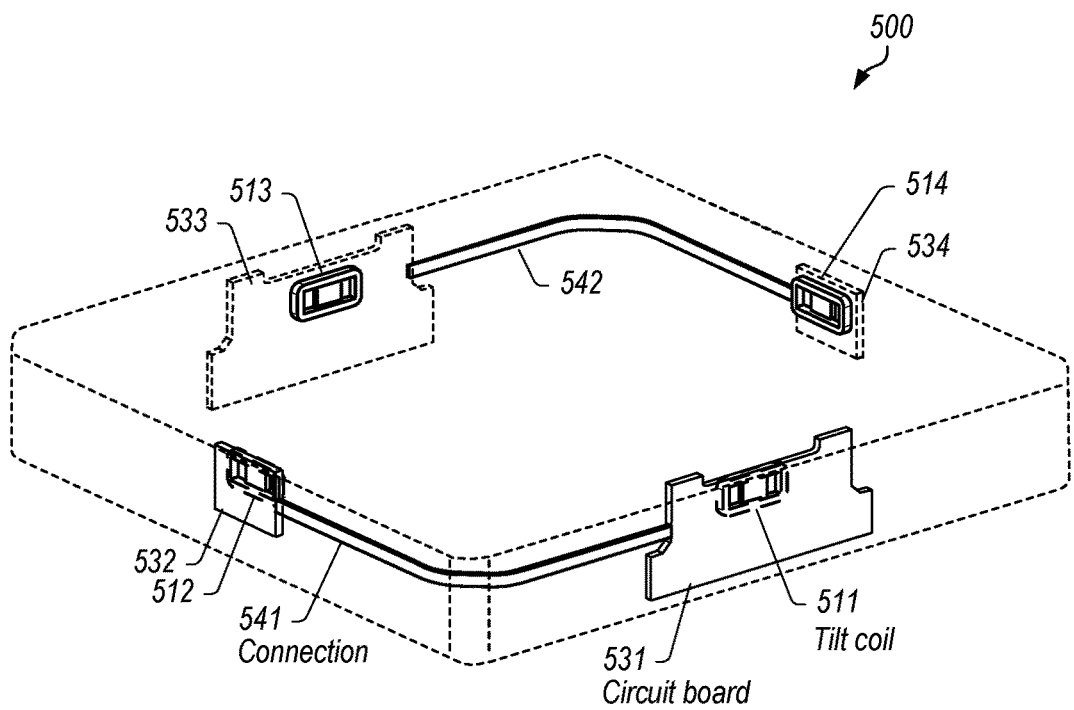
FIGS. 5A-5B show example fixtures for tilt coils of a camera, according to some embodiments.
Figure 5B:
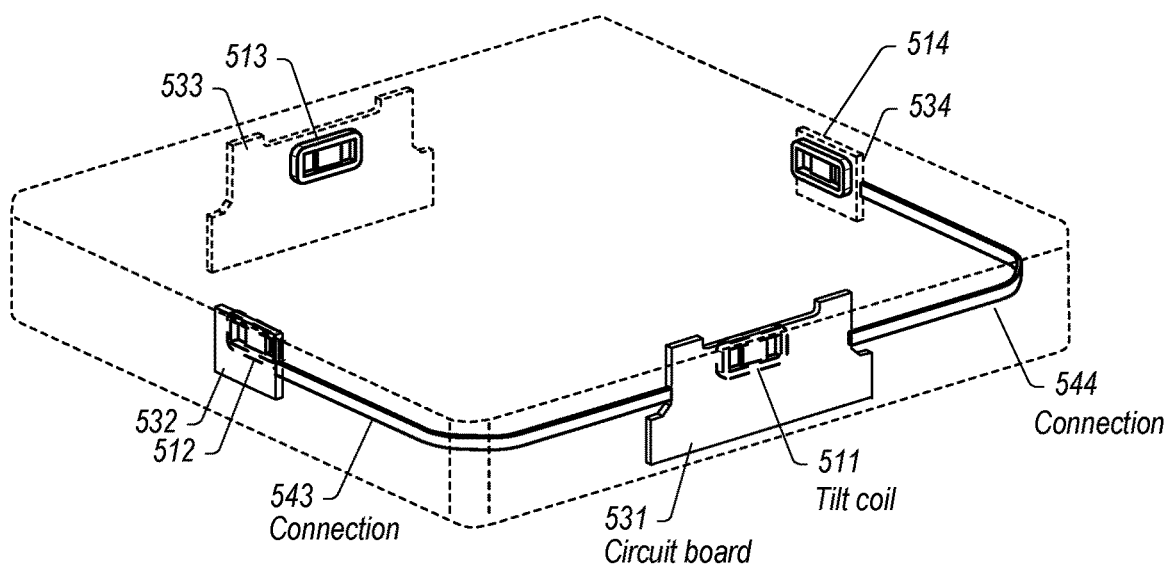

FIGS. 5A-5B show example fixtures for tilt coils of a camera, according to some embodiments. In FIG. 5A, camera 500 may include one or more tilt coils 511, 512, 513, and 514 attached to one or more stationary fixtures of camera 500. In some embodiments, the fixtures may include rigid circuit boards 531, 532, 533, and 534. In some embodiments, at last some of rigid circuit boards 531, 532, 533, and 534 may be connected using one or more flexible circuits 541 and 542. For instance, rigid circuit boards 531 and 532 (for tilt coils 511 and 512) may be connected through flexible circuit 541, whilst circuit boards 533 and 534 (for tilt coils 513 and 514) may be connected through flexible circuit 542. By comparison, in FIGS. 2A-2B, the fixtures for tilt coils 211, 212, 213, and 214 may include one single part surrounding a peripheral of the lenses of camera 200. In FIG. 5A, the fixtures for tilt coils 511, 512, 513, and 514 may include two separate parts—e.g., a first part (including rigid circuit boards 431 and 532 and flexible circuit 541) surrounding the front two sides of camera 500 and a second part (including rigid circuit boards 531 and 534 and flexible circuit 554) surrounding the rear two sides of camera 500.

FIG. 5B shows another embodiment for the fixtures of camera 500, according to some embodiments. In FIG. 5B, the fixtures for tilt coils 511, 512, 513, and 514 may still include multiple separate (disconnected) parts. However, unlike FIG. 5A, in FIG. 5B, rigid circuit boards 531, 532, and 534 may be connected together through flexible circuits 543 and 544, whilst circuit board 533 may remain as a separate standalone component. Note that FIGS. 5A-5B are only examples for purposes of illustration. The fixtures for tilt coils 511, 512, 513, and 514 may be implemented in various different designs, according to some embodiments.

FIGS. 6A-6E show an example process to form fixtures for tilt coils, according to some embodiments. In FIG. 6A, the fixtures for the tilt coils may include one single fixture wrapping around a periphery of one or more lenses of camera 600. The single fixture may be implemented following the steps indicated in FIGS. 6B-6E. For instance, the process may start with a single rigid-flex circuit board including rigid circuit boards 631, 632, 633, and 634 connected by flexible circuits 641, 642, and 643. A rigid-flex circuit board may broadly refer to any hybrid circuit board that integrates components from both a rigid or hardboard and a flexible circuit. The flexible circuit may be folded or continuously flexed in various shapes to fit a specific space or area. In addition, the rigid circuit board (e.g., rigid circuit boards 631, 632, 633, and/or 634) may include multiple layers, and the flexible circuit (e.g., flexible circuits 641, 642, and/or 643) may be buried internally and penetrate the rigid section of the rigid circuit board. As a result, the rigid-flex circuit board including the rigid circuit board (e.g., rigid circuit boards 631, 632, 633, and 634) and flexible circuit (e.g., flexible circuits 641, 642, and 643) may become one single connected piece. Referring back to FIGS. 6A-6E, the rigid-flex circuit board may further include one or more service loops to provide further flexibility to fold or bend flexible circuits 641, 642, and/or 643. As indicated in FIGS. 6C-6E, the rigid-flex circuit board may be folded, e.g., around the three corners of camera 600 at the service loops, to become wrapped around the perimeter of camera 600.

FIGS. 7A-7E show another example process to form fixtures for tilt coils, according to some embodiments. In FIG. &A, the fixtures for the tilt coils may include one single fixture wrapping around a periphery of one or more lenses of camera 700. The single fixture may be implemented following the steps indicated in FIGS. 7B-7E. For instance, the process may start with two rigid circuit boards 731 and 733, a first rigid-flex circuit board (including rigid circuit board 734 and flexible circuits 741 and 742), and a second rigid-flex circuit board (including rigid circuit board 732 and flexible circuit 743), as shown in FIGS. 7B-7C. In FIGS. 7D-7E, the first rigid-flex and the second rigid-flex circuit boards may be folded around the corners of camera 700 to be connected to rigid circuit boards 731 and 733. For instance, flexible circuit 741 of the first rigid-flex circuit board may be folded around the northeast and southeast corners of camera 700 and then soldered to rigid circuit board 733, e.g., using jet soldering at 751 and 752. In addition, flexible circuit 743 of the second rigid-flex circuit board may be folded around the southwest corner of camera 700 and soldered to rigid circuit board 732, e.g., using jet soldering at 753. As a result, rigid circuit boards 731 and 733, the first rigid-flex circuit board (including rigid circuit board 734 and flexible circuits 741 and 742), and the second rigid-flex circuit board (including rigid circuit board 732 and flexible circuit 743) may form a single fixture surrounding around a periphery of the lenses of camera 700.

FIGS. 8A-8B show an example embodiment for connecting a rigid circuit board and a flexible circuit, according to some embodiments. In FIG. 8A, rigid circuit board 731 may include one or more pads 761. In some embodiments, pads 761 may individually have an elongated shape, e.g., with a larger width than height, to accommodate length changes of flexible circuits 742 and 743. Flexible circuits 742 and 743 may individually include pads 762 and 763 and printed circuits. As indicated in FIG. 8B, flexible circuits 742 and 743 may be connected to rigid circuit board 731, e.g., using jet soldering 752 and 753 at corresponding pads 761, 762, and 763.

Figure 9:
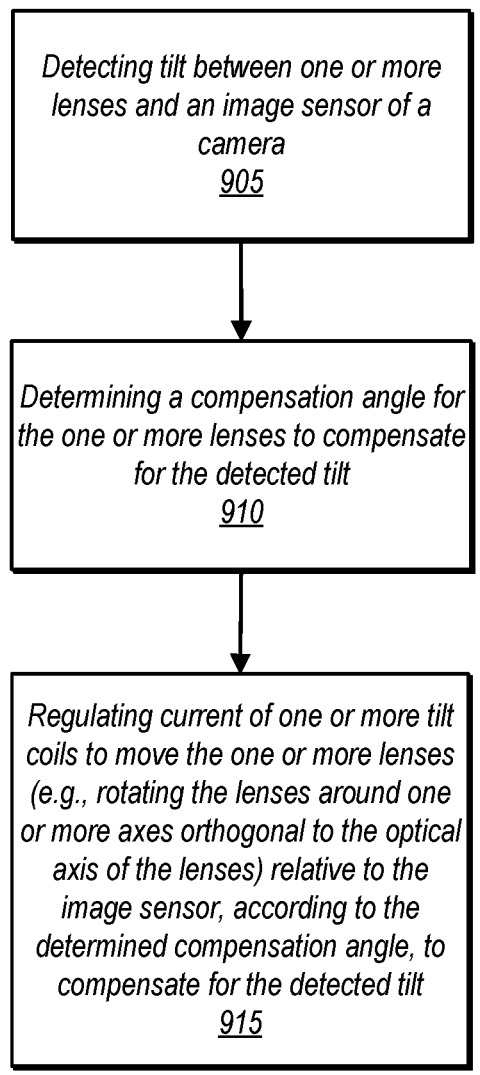
FIG. 9 is a high-level flowchart showing techniques to compensate for tilt of a camera, according to some embodiments.

FIG. 9 is a high-level flowchart showing techniques to compensate for tilt of a camera, according to some embodiments. In some embodiments, tilt between lens(es) and an image sensor of a camera may be detected by a tilt actuator, e.g., based on measurement of one or more tilt sensors, as indicated in block 905. As described above in FIG. 2, in some embodiments, the camera may include one or more tilt sensors (e.g., position sensors) arranged surrounding a peripheral of the lenses of the camera. In some embodiments, the tilt sensors may operate in pairs to detect tilt around X- and/or Y-axes. For instance, two tilt sensors positioned opposite each other along X-axis may measure relative positions between corresponding tilt magnets and tilt coils arranged along X-axis. The measurement from the two tilt sensors may be processed, e.g., to produce a "differential mode" component indicating tilt between the lens(es) and image sensor around Y-axis and/or a "common mode" component indicating a position or distance between the lens(es) and image sensor along Z-axis. Similarly, other two tilt sensors arranged along another axis (e.g., Y-axis) may be used to detect tilt between the lens(es) and image sensor around X-axis. Note that in some embodiments, the camera may use more or less tilt sensors (e.g., three position sensors) to detect the unexpected tilt.

In response to detecting the tilt, a compensation angle may be determined for the lens(es) to compensate for the detected tilt, according to some embodiments, as indicated in block 910. For instance, when it is detected that the lens(es) are tilted relative to the image sensor around X-axis clockwise at 0.02 degrees (e.g., +0.02 degrees), a compensation angle may be determined to be 0.02 degrees counter-clockwise around X-axis (e.g., −0.02 degrees) for the lens(es). Next, current of one or more tilt coils of the tilt actuator may be regulated (e.g., in terms of values and/or polarities) to move the lens(es) according to the compensation angle to re-align the lens(es) with the image sensor of the camera, as indicated in block 915. As described above, in some embodiments, the tilt coils of the camera may operate in pairs. Thus, depending on the tilt between the lens(es) and image sensor, one or more pairs of the tilt coils may be controlled to rotate the lens(es) approximately around one or more axes to compensate for the detected tilt.

Figure 10:
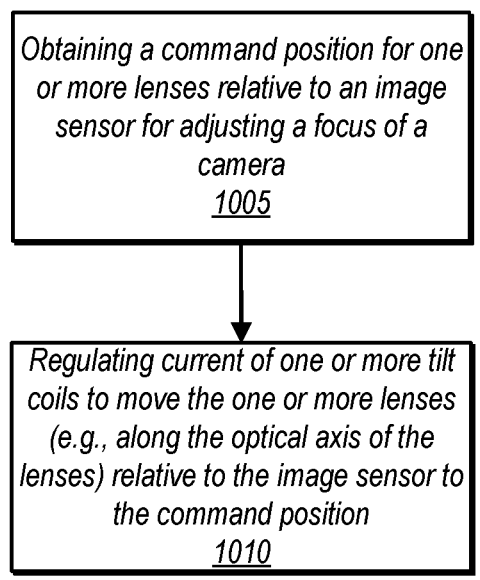
FIG. 10 is a high-level flowchart showing techniques to adjust a focus of a camera, according to some embodiments.

FIG. 10 is a high-level flowchart showing techniques to adjust a focus of a camera, according to some embodiments. As described above, a tilt actuator of a camera may move lens(es) relative to an image sensor of the camera in a direction approximately parallel to an optical axis (e.g., Z-axis) of the lens(es). As indicated in block 1005, a command position for the lens(es) relative to the image sensor may be obtained by the tilt actuator for adjusting a focus of the camera, according to some embodiments. The command position may indicate a relative distance and/or position of the lens(es) with respect to the image sensor along the optical axis (or Z-axis). Next, current of one or more tilt coils of the tilt actuator may be regulated to move the lens(es) relative to the image sensor to the command position, as indicated in block 1010. As described above, in some embodiments, the tilt coils of the camera may operate in pairs. For the focus adjustment, one or more pairs of the tilt coils may be activated to generate the motive force (e.g., like counter-acting force F1 and F3 in FIG. 3) in a same direction to move the lens(es) relative to the image sensor along the optical axis (or Z-axis).

Figure 11:
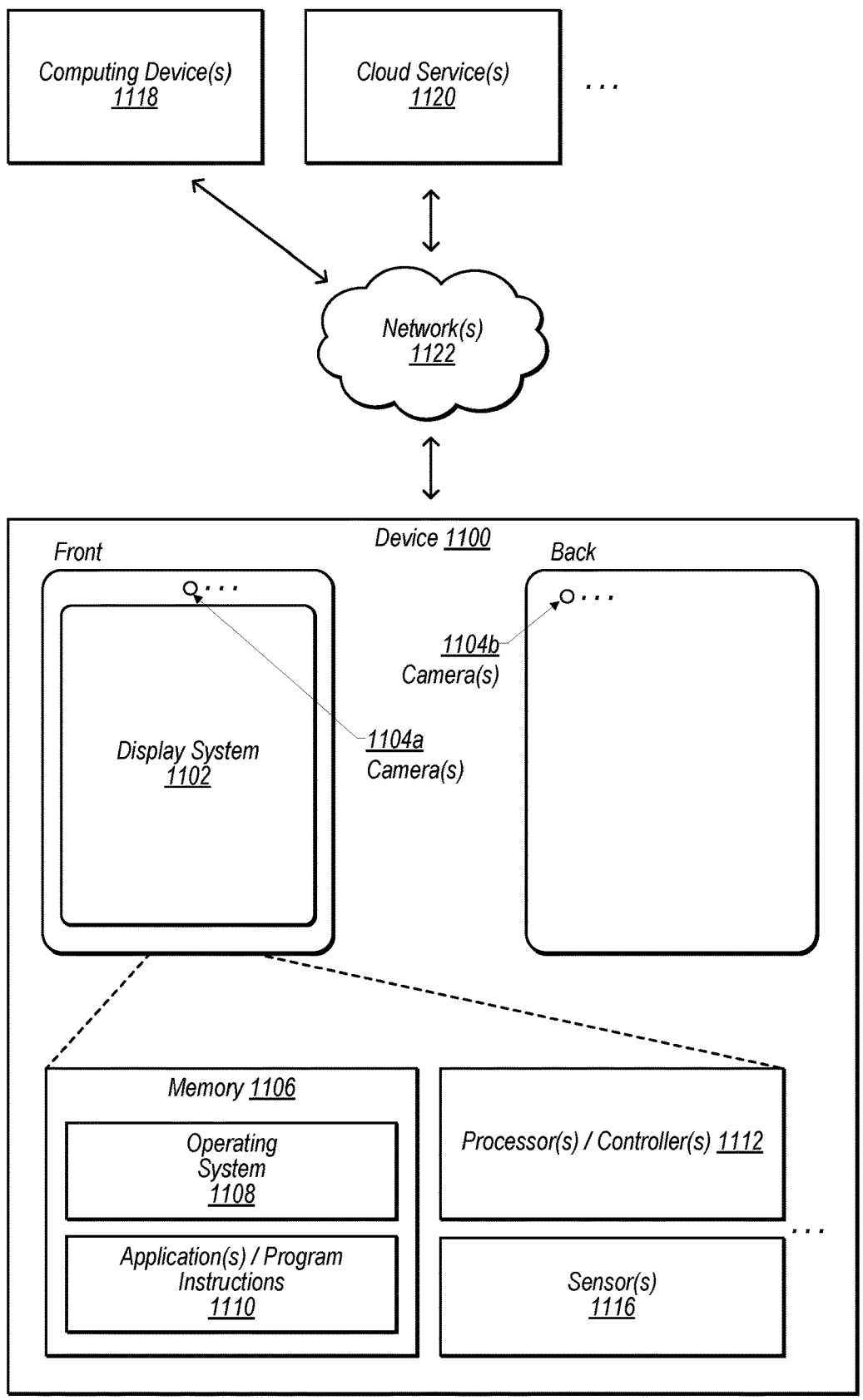
FIG. 11 illustrates a schematic representation of an example device that may include a camera with tilt compensation, according to some embodiments.

FIG. 11 illustrates a schematic representation of an example device 1100 that may include a camera with tilt compensation, e.g., as described herein with reference to FIGS. 1-10, according to some embodiments. In some embodiments, the device 1100 may be a mobile device and/or a multifunction device. In various embodiments, the device 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1100 may include a display system 1102 (e.g., comprising a display and/or a touch-sensitive surface) and/or one or more cameras 1104. In some non-limiting embodiments, the display system 1102 and/or one or more front-facing cameras 1104a may be provided at a front side of the device 1100, e.g., as indicated in FIG. 11. Additionally, or alternatively, one or more rear-facing cameras 1104b may be provided at a rear side of the device 1100. In some embodiments comprising multiple cameras 1104, some or all of the cameras may be the same as, or similar to, each other. Additionally, or alternatively, some or all of the cameras may be different from each other. In various embodiments, the location(s) and/or arrangement(s) of the camera(s) 1104 may be different than those indicated in FIG. 11.

Among other things, the device 1100 may include memory 1106 (e.g., comprising an operating system 1108 and/or application(s)/program instructions 1110), one or more processors and/or controllers 1112 (e.g., comprising CPU(s), memory controller(s), display controller(s), and/or camera controller(s), etc.), and/or one or more sensors 1116 (e.g., orientation sensor(s), proximity sensor(s), and/or position sensor(s), etc.). In some embodiments, the device 1100 may communicate with one or more other devices and/or services, such as computing device(s) 1118, cloud service(s) 1120, etc., via one or more networks 1122. For example, the device 1100 may include a network interface (e.g., network interface 1210) that enables the device 1100 to transmit data to, and receive data from, the network(s) 1122. Additionally, or alternatively, the device 1100 may be capable of communicating with other devices via wireless communication using any of a variety of communications standards, protocols, and/or technologies.

Figure 12:
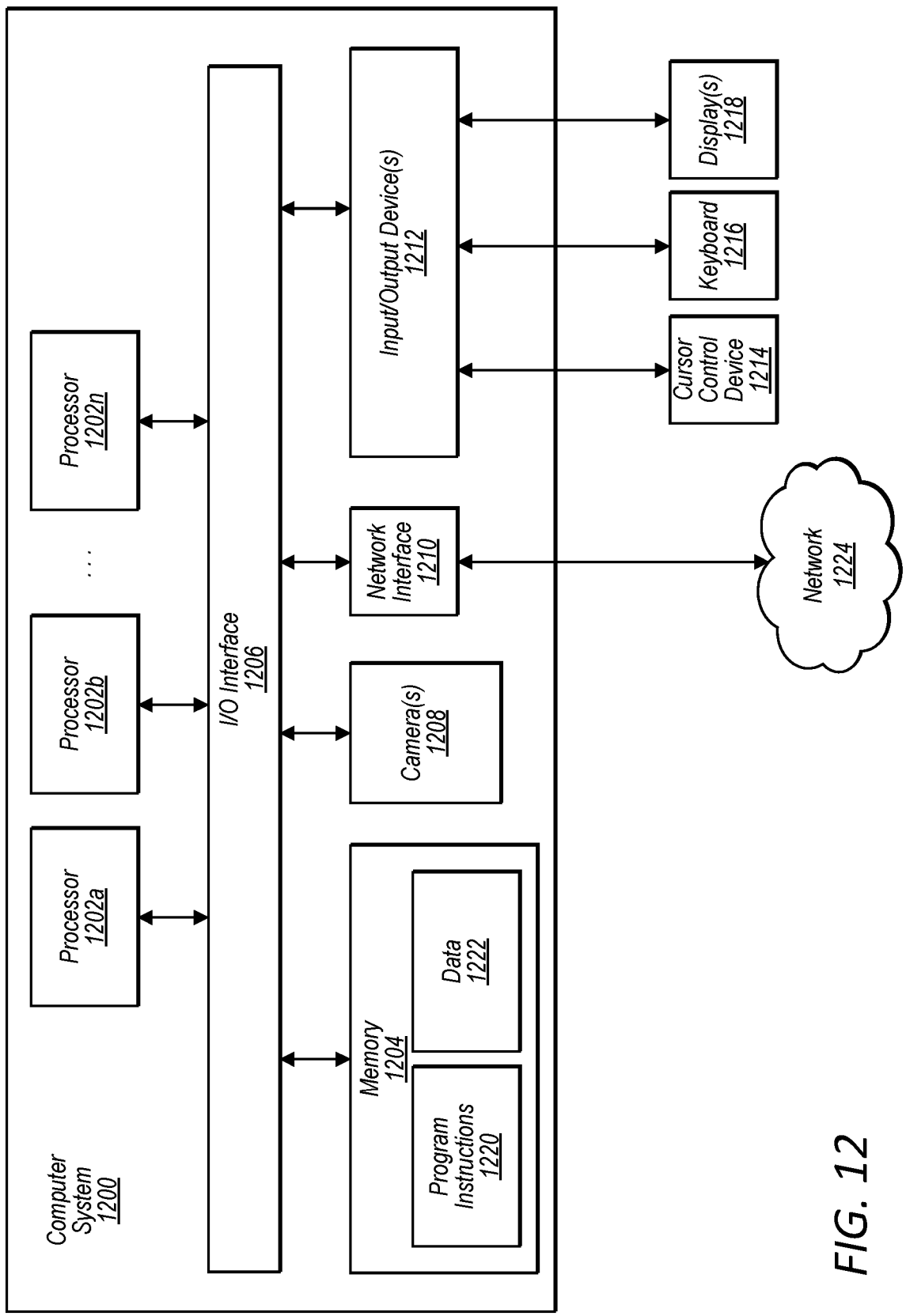
FIG. 12 illustrates a schematic block diagram of an example computer system that may include a camera with tilt compensation, according to some embodiments.

FIG. 12 illustrates a schematic block diagram of an example computing device, referred to as computer system 1200, that may include or host embodiments of a camera with tilt compensation, e.g., as described herein with reference to FIGS. 1-11, according to some embodiments. In addition, computer system 1200 may implement methods for controlling operations of the camera and/or for performing image processing images captured with the camera. In some embodiments, the device 1100 (described herein with reference to FIG. 11) may additionally, or alternatively, include some or all of the functional components of the computer system 1200 described herein.

The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1200 includes one or more processors 1202 coupled to a system memory 1204 via an input/output (I/O) interface 1206. Computer system 1200 further includes one or more cameras 1208 coupled to the I/O interface 1206. Computer system 1200 further includes a network interface 1210 coupled to I/O interface 1206, and one or more input/output devices 1212, such as cursor control device 1214, keyboard 1216, and display(s) 1218. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1202, or a multiprocessor system including several processors 1202 (e.g., two, four, eight, or another suitable number). Processors 1202 may be any suitable processor capable of executing instructions. For example, in various embodiments processors 1202 may be general-purpose or embedded processors implementing any of a variety of instruction set architectures (ISAs), such as the x86, PowerPC, SPARC, or MIPS ISAs, or any other suitable ISA. In multiprocessor systems, each of processors 1202 may commonly, but not necessarily, implement the same ISA.

System memory 1204 may be configured to store program instructions 1220 accessible by processor 1202. In various embodiments, system memory 1204 may be implemented using any suitable memory technology, such as static random access memory (SRAM), synchronous dynamic RAM (SDRAM), nonvolatile/Flash-type memory, or any other type of memory. Additionally, existing camera control data 1222 of memory 1204 may include any of the information or data structures described above. In some embodiments, program instructions 1220 and/or data 1222 may be received, sent or stored upon different types of computer-accessible media or on similar media separate from system memory 1204 or computer system 1200. In various embodiments, some or all of the functionality described herein may be implemented via such a computer system 1200.

In one embodiment, I/O interface 1206 may be configured to coordinate I/O traffic between processor 1202, system memory 1204, and any peripheral devices in the device, including network interface 1210 or other peripheral interfaces, such as input/output devices 1212. In some embodiments, I/O interface 1206 may perform any necessary protocol, timing or other data transformations to convert data signals from one component (e.g., system memory 1204) into a format suitable for use by another component (e.g., processor 1202). In some embodiments, I/O interface 1206 may include support for devices attached through various types of peripheral buses, such as a variant of the Peripheral Component Interconnect (PCI) bus standard or the Universal Serial Bus (USB) standard, for example. In some embodiments, the function of I/O interface 1206 may be split into two or more separate components, such as a north bridge and a south bridge, for example. Also, in some embodiments some or all of the functionality of I/O interface 1206, such as an interface to system memory 1204, may be incorporated directly into processor 1202.

Network interface 1210 may be configured to allow data to be exchanged between computer system 1200 and other devices attached to a network 1224 (e.g., carrier or agent devices) or between nodes of computer system 1200. Network 1224 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1210 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1212 may, in some embodiments, include one or more display terminals, keyboards, keypads, touchpads, scanning devices, voice or optical recognition devices, or any other devices suitable for entering or accessing data by one or more computer systems 1200. Multiple input/output devices 1212 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1210.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    an image sensor;
    one or more lenses;
    an autofocus (AF) actuator that includes one or more AF coils and one or more AF magnets, wherein the one or more AF coils are fixedly coupled with the one or more lenses;
    a tilt actuator that includes one or more tilt coils and one or more tilt magnets, wherein the one or more tilt magnets are fixedly coupled with the one or more lenses; and
    a controller to control:
        operation of the AF actuator to control current to flow through the one or more AF coils to interact with one or more magnetic fields of the one or more AF magnets to generate motive force to move the one or more lenses relative to the image sensor in a direction parallel to the optical axis of the one or more lenses;
        operation of the tilt actuator to control current to flow through the one or more tilt coils to interact with one or more magnetic fields of the one or more tilt magnets to generate motive force to rotate the one or more lenses relative to the image sensor around one or more axes orthogonal to the optical axis of the one or more lenses and to control current to flow through the one or more tilt coils to generate motive force to move the one or more lenses relative to the image sensor in the direction parallel to the optical axis of the one or more lenses to supplement the AF actuator.

2. The system of claim 1, wherein the one or more tilt magnets include at least four magnets arranged around a periphery of the one or more lenses, wherein two magnets of the at least four magnets are positioned opposite each other along one axis orthogonal to the optical axis of the one or more lenses, and wherein another two magnets of the at least four magnets are positioned opposite each other along another axis orthogonal to the optical axis of the one or more lenses.

3. The system of claim 1, wherein the one or more tilt magnets individually include a dual-pole magnet.

4. The system of claim 1, wherein the one or more tilt coils include at least four coils arranged around a periphery of the one or more lenses, wherein two of the at least four coils are positioned opposite each other along one axis orthogonal to the optical axis of the one or more lenses, and wherein another two of the at least four coils are positioned opposite each other along another axis orthogonal to the optical axis of the one or more lenses.

5. The system of claim 1, wherein the one or more tilt magnets include at least two magnets, wherein the one or more tilt coils include at least two coils, wherein the controller is configured to control the current flowing through one of the tilt coils to interact with one of the tilt magnets to generate a first motive force, and control the current flowing through another one of the tilt coils to interact with another one of the tilt magnets to generate a second motive force, and wherein the first and second motive force are in opposite directions to rotate the one or more lenses relative to the image sensor around an axis orthogonal to the optical axis of the one or more lenses.

6. The system of claim 1, further comprising:
    one or more position sensors individually for a respective one of the tilt coils of the tilt actuator,
    wherein one pair of the position sensor and the respective tilt coil is attached to a corresponding stationary circuit board.

7. The system of claim 1, wherein the controller is further configured to control the current flowing through the one or more tilt coils to generate different motive force capable of moving the one or more lenses relative to the image sensor in a direction parallel to the optical axis of the one or more lenses.

8. The system of claim 1, wherein the one or more AF coils are wound around a periphery of the one or more lenses.

9. The system of claim 1, wherein the one or more AF magnets include at least four magnets arranged around a periphery of the one or more lenses, wherein two of the magnets are positioned opposite each other along one axis orthogonal to the optical axis of the one or more lenses, and wherein another two of the magnets are positioned opposite each other along another axis orthogonal to the optical axis of the one or more lenses.

10. A device, comprising:
    one or more lenses;
    an image sensor configured to generate imaging signals based on light passing through the one or more lenses;
    a processor configured to process the imaging signals to generate an image; and
    an autofocus (AF) actuator that includes one or more AF coils and one or more AF magnets, wherein the one or more AF coils are fixedly coupled with the one or more lenses, wherein the AF actuator is controlled to conduct current through the one or more AF coils that interact with one or more magnetic fields of the one or more AF magnets to generate motive force to move the one or more lenses relative to the image sensor in a direction parallel to an optical axis of the one or more lenses;
    a tilt actuator that includes one or more tilt coils and one or more tilt magnets, wherein the one or more tilt magnets are fixedly coupled with the one or more lenses, and wherein the tilt actuator is controlled to conduct current through the one or more tilt coils to interact with one or more magnetic fields of the one or more tilt magnets to generate motive force capable of rotating the one or more lenses relative to the image sensor around one or more axes orthogonal to the optical axis of the one or more lenses and to generate additional motive force to move the one or more lenses relative to the image sensor in the direction parallel to the optical axis of the one or more lenses to supplement actuation of the AF actuator.

11. The device of claim 10, wherein the one or more tilt magnets include at least four magnets, wherein the one or more tilt coils include at least four coils to interact individually with respective ones of the at least four magnets to form at least four pairs of magnet and respective coil, wherein the four pairs are arranged around a periphery of the one or more lenses, wherein two pairs are positioned opposite each other along one axis orthogonal to the optical axis of the one or more lenses, and wherein another two pairs are positioned opposite each other along another axis orthogonal to the optical axis of the one or more lenses.

12. The device of claim 10, wherein the one or more tilt magnets include at least two magnets, wherein the one or more tilt coils include at least two coils, wherein the tilt actuator is controlled to conduct the current through one of the tilt coils to interact with one of the tilt magnets to generate a first motive force, and conduct the current through another one of the tilt coils to interact with another one of the tilt magnets to generate a second motive force, and wherein the first and second motive force are in opposite directions to rotate the one or more lenses relative to the image sensor around an axis orthogonal to the optical axis of the one or more lenses.

13. The device of claim 10, wherein the one or more tilt magnets include at least two magnets, wherein the one or more tilt coils include at least two coils, wherein the tilt actuator is controlled to conduct the current through one of the coils to interact with one of the magnets to generate a first motive force, and conduct the current through another one of the coils to interact with another one of the magnets to generate a second motive force, and wherein the first and second motive force are in opposite directions to rotate the one or more lenses relative to the image sensor around an axis orthogonal to the optical axis of the one or more lenses.

14. The device of claim 10, further comprising:
one or more position sensors individually for a respective one of the tilt coils of the actuator,
wherein one pair of the position sensor and the respective tilt coil is attached to a corresponding stationary circuit board.

15. The device of claim 10, wherein the one or more AF coils are wound around a periphery of the one or more lenses, and wherein the one or more AF magnets are individually attached with respective stationary portions of the device positioned around the periphery of the one or more lenses.

16. The device of claim 10, further comprising:
additional one or more coils and additional one or more magnets, wherein the additional one or more coils are fixedly coupled with the image sensor,
wherein the additional one or more coils conduct additional current to interact with one or more additional magnetic fields of the additional one or more magnets to generate additional motive force capable of moving the image sensor relative to the one or more lenses in one or more directions orthogonal to the optical axis of the one or more lenses.

17. A method, comprising:
detecting, using one or more position sensors, a position of one or more lenses of a camera relative to an image sensor of the camera along an optical axis of the one or more lenses;
determining, using a controller, a change in position of the one or more lenses relative to the image sensor along the optical axis of the one or more lenses;
controlling, using the controller according to the change in the position, current through one or more AF coils of an AF actuator that electromagnetically interact with one or more AF magnets of the AF actuator to move the one or more lenses relative to the image sensor in a direction along the optical axis of the one or more lenses, wherein the one or more AF coils are fixedly coupled with the one or more lenses;
controlling, using the controller according to the change in position, current through one or more tilt coils of a tilt actuator that electromagnetically interact with one or more tilt magnets of the tilt actuator to generate motive force to move the one or more lenses relative to the image sensor in the direction along the optical axis of the one or more lenses to supplement actuation of the AF actuator, wherein the one or more magnets are fixedly coupled with the one or more lenses; and
controlling, using the controller according to a compensation for a tilt angle, current through the one or more tilt coils of the tilt actuator that electromagnetically interacts with the one or more tilt magnets of the tilt actuator to rotate the one or more lenses relative to the image sensor around one or more axes orthogonal to the optical axis of the one or more lenses.

18. The method of claim 17, wherein the one or more tilt magnets of the tilt actuator include at least four magnets, wherein the one or more tilt coils of the tilt actuator include at least four coils to interact individually with respective ones of the at least four magnets to form at least four pairs of magnet and respective coil, wherein the four pairs are arranged around a periphery of the one or more lenses, wherein two pairs are positioned opposite each other along one axis orthogonal to the optical axis of the one or more lenses, and wherein another two pairs are positioned opposite each other along another axis orthogonal to the optical axis of the one or more lenses.

* * * * *